United States Patent [19]

Weglin et al.

[11] 4,353,322
[45] Oct. 12, 1982

[54] LOW INFLATION WARNING DEVICE FOR PNEUMATIC TIRES

[75] Inventors: Walter Weglin, Bellevue; James M. Daly, Kirkland, both of Wash.

[73] Assignee: Rockcor, Inc., Redmond, Wash.

[21] Appl. No.: 260,478

[22] Filed: May 4, 1981

Related U.S. Application Data

[63] Continuation of Ser. No. 59,720, Jul. 23, 1979, abandoned.

[51] Int. Cl.$^3$ ............................................. B60C 23/06
[52] U.S. Cl. ............................. 116/34 B; 116/34 R; 116/70
[58] Field of Search ..................... 116/34 B, 34 R, 70, 116/34 A; 200/61.23; 340/58

[56] References Cited

U.S. PATENT DOCUMENTS

| 3,154,048 | 10/1964 | Neu | 116/34 R |
| 3,489,998 | 1/1970 | O'Neal | 340/58 |
| 3,593,269 | 7/1971 | Richardson | 200/61.23 |
| 4,117,452 | 9/1978 | Snyder | 340/58 |
| 4,201,147 | 5/1980 | Goshima | 116/34 B |
| 4,235,184 | 11/1980 | Schiavone | 116/34 R |

FOREIGN PATENT DOCUMENTS 1447244 8/1976 United Kingdom .

Primary Examiner—Stuart S. Levy
Assistant Examiner—Denis F. Corr
Attorney, Agent, or Firm—Dowrey & Cross

[57] ABSTRACT

The low inflation warning device is a mechanical sound generating apparatus designated for attachment to a wheel assembly such that the apparatus is contained within the pneumatic space formed by the tire and rim. Whenever a condition of low pressure or overload exists on the wheel assembly a warning signal is generated. The signal is initiated by contact of the interior surface of the tire casing with the apparatus. The contact causes a portion of the apparatus to strike an anvil with sufficient force to generate an audible sound. The apparatus is self-setting under the influence of centrifugal force and will generate a warning of insufficient tire pressure or excessive tire load. The apparatus will generate a signal with each revolution of the wheel assembly to which it is mounted. Under extreme low inflation conditions the apparatus will continue to generate periodic warnings without damage to the tire.

6 Claims, 14 Drawing Figures

LOW INFLATION WARNING DEVICE FOR PNEUMATIC TIRES

This application is a continuation of application Ser. No. 59,720, filed July 23, 1979 now abandoned.

FIELD OF THE INVENTION

This invention relates to low inflation warning devices for pneumatic tires and particularly to such devices that mechanically generate audible low inflation warning signals.

BACKGROUND OF THE INVENTION

Pneumatic tire low inflation warning systems have been proposed for decades. However, little commercialization of these systems has occurred for any one of a number of reasons, such as: high cost; low reliability; difficulty of installation; and low consumer demand. Now, however, with increasing emphasis on increasing safety, reducing automobile size and weight, automotive safety, elimination of the spare tire and use of puncture-resistant self-sealing tubeless tires, automobile manufacturers are renewing their interest in these systems. The criteria that must be met are many: (1) low cost; (2) uncomplicated assembly and installation; (3) suitability for use with self-sealing tires; (4) operability over the expected life of the automobile; and (5) capability of functioning to generate warning signals when a tire is (a) completely flat, (b) "nearly flat" and (c) "too low", (6) failure mode characteristics.

Category (4) above is particularly important. Using a modern, radial automobile tire as an example, most drivers cannot detect a low pressure condition even when a tire pressure as low as 5-9 psig exists. A tire pressure that is lower than normal should be detected even if not readily apparent. For example a radial tire with that pressure range could be characterized as "nearly flat". Moreover, when a radial tire has a pressure below about 15 psig, prolonged use could significantly reduce its life span. Thus, a radial tire pressure below about 15 psig could be characterized as "too low". When a tire is completely flat, although one would expect all drivers to be cognizant of that condition, the warning device must function and must also survive for continued use when the flat tire is replaced or repaired and reinstalled. Finally the device should not damage the tire when driven on in unactivated mode.

SUMMARY OF THE INVENTION

The low inflation warning device of this invention is a mechanical assembly designed to be mounted on a wheel. The device, under appropriate tire pressure and load conditions, will generate audible sound by striking an anvil to produce warning signals. Actuation of the device to produce warning signals is triggered by contact between the device and the tire. The tire contacts the device because of low inflation. The tire is deformed to a greater than normal degree and is thus displaced toward the center of the tire. The device resets itself after each actuation under the influence of centrifugal force during wheel revolution, even at relatively low speeds.

The device may be manually retracted within the confines outlined by the largest diameter of the metal wheel if it is desired to change the tire. The device, furthermore, may be completely contained within the pneumatic space of the wheel assembly. Consequently, normal production methods for automatic assembly of tires to wheel rims and normal service operations (such as tire removal, tire mounting, wheel removal and re-mounting) may be employed. When a tire has been mounted to a wheel rim and the wheel installed, the device having been positioned in a retracted, or out of the way state, as described, revolution of the wheel at a relatively low speed (e.g. driveway speed) will set the device for subsequent warning actuation.

The device is comprised of a mounting subassembly and a signal generating subassembly. The mounting subassembly attaches the signal generating subassembly to the tire rim. The signal generating subassembly generates an audible signal when contacted by the inner surface of the rim. In one embodiment the mounting subassembly is a gimbal arrangement. A second embodiment uses a series of anvils attached to the rim as a mounting subassembly. All embodiments utilize a spring in the signal generating subassembly to store energy of movement caused by contact with the tire and suddenly release the stored energy. The release of stored energy plus the velocity imparted to the contact wheel impel the strikes mass against the wheel, causing the sound.

DETAILED DESCRIPTION OF THE DRAWINGS

When a low air pressure condition and/or a high load is present in a tire, the tire deforms to a greater degree at the point of contact with the road than is normal. The inner circumference of the tire is displaced towards the axis of the tire to a further degree than it is displaced at full inflation and rated load. The low tire air pressure can be the result of either a puncture causing a loss of air or a decrease in temperature of the air in the tire without addition of air by the driver or an excessive load. If this condition is not remedied, the constant increased deformation of the tire will lead to damage to the tire.

The device herein described uses this deformation as a sensing mechanism to indicate low tire air pressure.

FIGS. 1–4 illustrate a first embodiment of the device. The device has two subassemblies. The first subassembly, a mounting subassembly, mounts the second subassembly, a signal generator, to the wheel 11. The mounting subassembly includes a metal band 201, which is preferably spring steel, around the circumference of the wheel. The steel band 201 attaches at either end to the arms 200, 202 of a mounting member 203. Arms 200, 202 of member 203 have a rounded profile. The rounded profile of arms 200, 202, combined with the ability to twist off band 201, allow the mounting assembly to provide a limited degree of side-to-side motion. The side-to-side motion is limited by ears 204 which will contact wheel 11 at the extremes. (The side-to-side motion is necessary to prevent damage to the device when riding over curbs and other obstructions.) Ears 204 also provide holes 205 used to mount the signal generating subassembly. Screws 206 attach to boss 207 of the signal generating subassembly. Boss 207 passes through bushing 208 inserted into hole 205 of the mounting assembly. A washer 209, preferably nylon, surrounds the part of boss 207 that protrudes through hole 205. Lock washer 210 prevents screw 206 from loosening under environmental conditions. The mounting subassembly thus provides a pivotal mounting for the signal generating subassembly.

The sound generating subassembly has two contact wheels 215 in this embodiment. Wheels 215 are held on axle 216 by cotter pins 217 and flat washer 214. Axle 216 passes through hole 218 in extension arm 214. Extension arm 219 fits within spring housing 220. Extension arm 214 may be made to protrude to a greater degree from housing 220 by selection of spacer 230 and adjustment of set screw 222. Main spring 223 fits between the area defined by the outer circumference of extension arm 214 and the interior of main spring housing 220. Main spring housing 220 is slidably mounted within main cylinder 221. Rotation of main spring housing 220 relative to main cylinder 221 is prevented by main pin 211 which passes through slot 223 in main cylinder 221 and slot 224 in spring housing 220. Main pin 211 also passes through plunger 224. Plunger 224 is within the circumferences of main cylinder 221 and spring housing 220. The upper portion 225 of plunger 212 protrudes from the top of main cylinder 221 and the lower portion 226 provides a cavity to receive spring 223. Spring 223 is thus held in compression between spring housing 220 and plunger 212.

The device is installed by attaching one end of band 201 to one arm 202 of the mounting subassembly. Band 201 is then stretched around the wheel rim and attached to the other arm 200. The device is moved into the FIG. 2 position when a tire is mounted to the rim.

Figure 1:
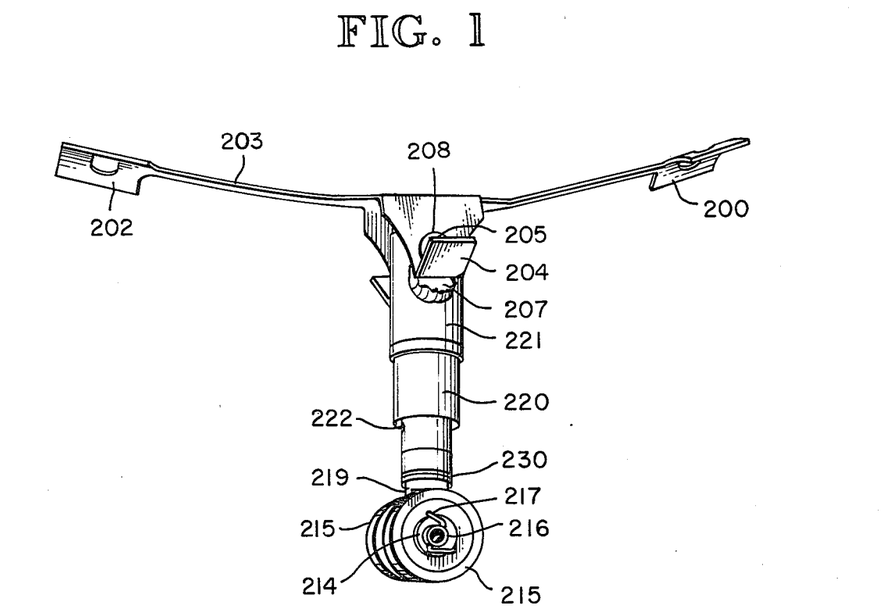
FIG. 1 is an illustration of the embodiment of the device.
Figure 2:
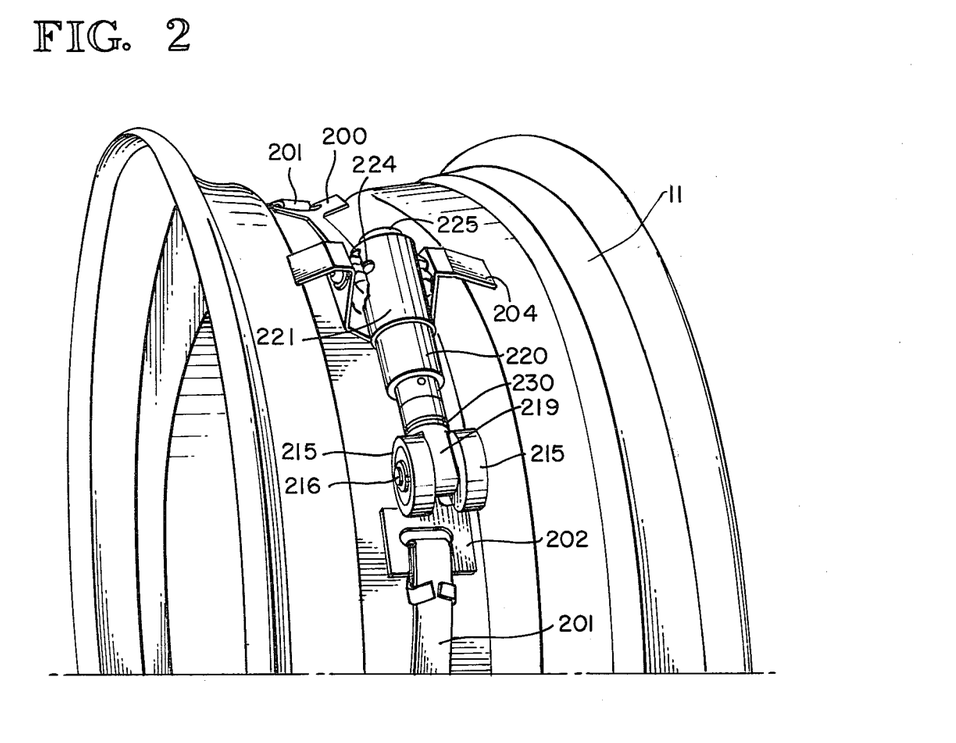
FIG. 2 is a view of the FIG. 1 device mounted to a tire rim in mounting position.
Figures 3, 4:
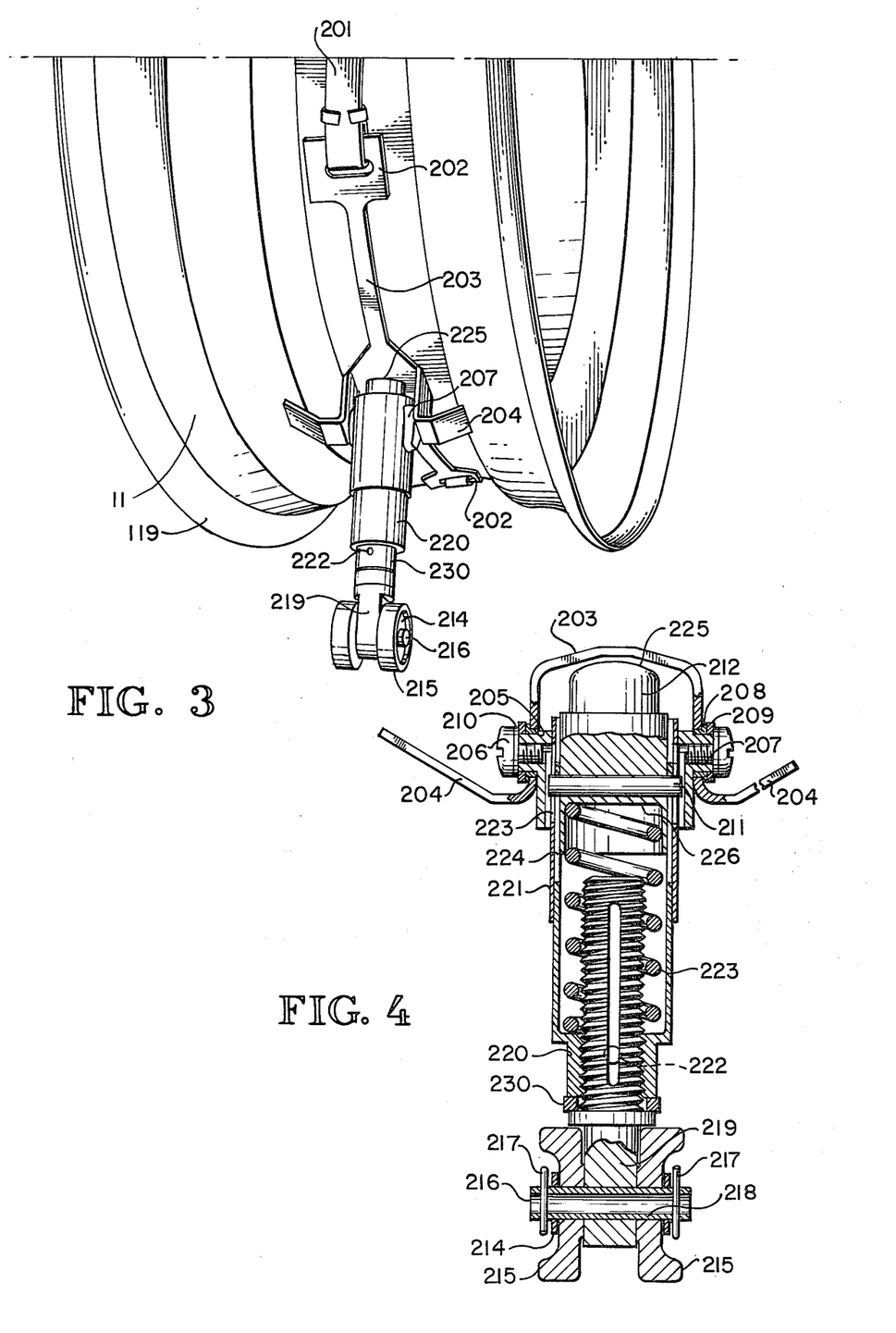
FIG. 3 is a view of the FIG. 1 device mounted to a tire rim in operating position.
FIG. 4 is a sectional view of the FIG. 1 device.

In operation the device is urged into the FIG. 3 position by centrifugal force due to the rim's rotation. If a condition of low inflation is present the interior of the tire (not shown) will contact wheels 215. As a result of the contact wheels 215 will be driven upward. As spring housing 220 is attached to wheels 215 as described above it will also be driven upward. The upward movement of spring housing 220 will compress spring 223. Plunger 212 will not yet begin to move due to inertia. When the top of extension arm 230 contacts plunger 212's lower portion 226 or spring compression becomes sufficient to overcome plunger 225's inertia plunger 212 will begin to move upward. The stored energy in spring 223 will accelerate plunger 212's upward motion. The upward motion will continue until the top 225 of plunger 212 strokes mounting member 203. A sharp sound will result. Once the device rotates past the road centrifugal force will urge the movable parts of the device outward resetting the device. The result is that a loud series of sounds will be produced. One sound will be produced each time the device rotates past the road when a condition of low inflation is present. The released energy propels the plunger into contact with member 203 producing an audible signal. In this embodiment the member 203 functions as an anvil. Centrifugal force resets the signal generating subassembly.

FIGS. 5–9 illustrate a second embodiment of the device. This device has two major subassemblies. The first subassembly, a mounting assembly, includes a gimbal mounted to the wheel. The gimbal provides for limited pivotal motion in a side-to-side direction in a plane perpendicular to the plane of the wheel's rotation allowing the device to accomodate flexure of the tire that occurs when only one side of the tire passes over an object. The gimbal allows a greater freedom of motion in the direction perpendicular to the axis of rotation of the wheel. This motion is only limited by the impact of stops 1, 2 against wheel 11. The device may thus remain in the FIG. 1 position during installation of the tire and assembly. The second subassembly is that of the signal generator. The signal generator includes a wheel that contacts the tire casing when low tire inflation is present. The energy of movement of this wheel is stored in a spring and released by a sear mechanism.

Figures 5, 6:
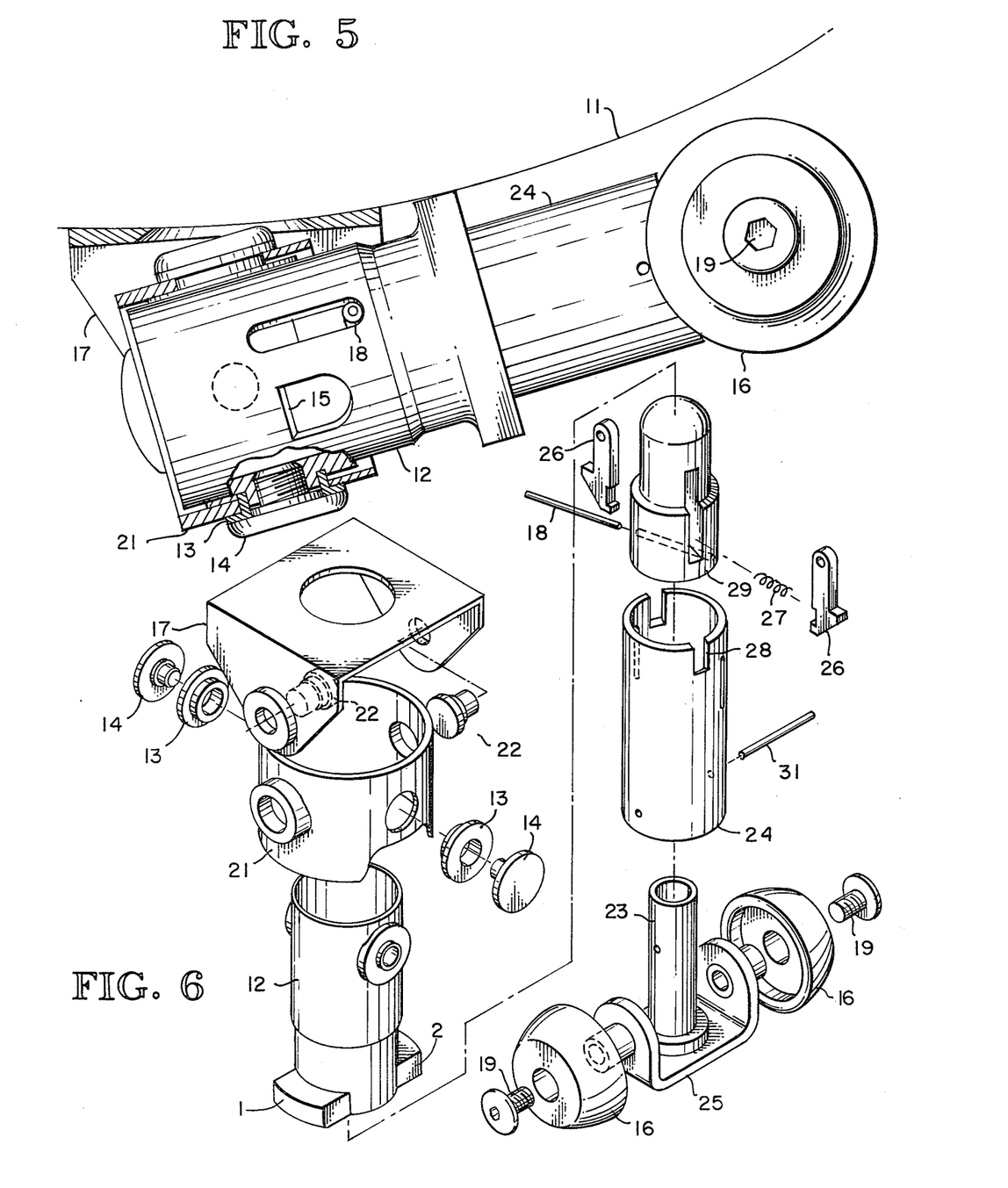
FIG. 5 is an illustration of a second embodiment of the device as mounted on a tire rim.
FIG. 6 is an exploded view of the FIG. 5 device.

FIG. 5 shows the warning device mounted by the mounting subassembly and resting in mounting position on the wheel 11. The mounting subassembly includes a mounting bracket 17 which may be attached to wheel 11 by any acceptable fastening methods included but not limited to welding, band, screws, and adhesives. The device is positioned folded back against wheel 11 as shown to allow the mounting of a tire to wheel 11. In the mounting position the contact wheel 16 attached to axle 19 is in proximity to wheel 11. Further components of the mounting subassembly include mounting cylinder 12 attached to mounting bracket 17 an a gimbal arrangement comprised of gimbal ring 21 and pivots 14 and 22. Mounting cylinder 12 is pivotably connected to gimbal ring 21 by pivots 14. Bushing 13 reduces friction between the pivots 14 and gimbal ring 21. The mounting subassembly allows the device to swing into a position normal to the tire axis during rotation of the wheel due to the influence of centrifugal force. The gimbal mounting also provides a limited degree of side-to-side movement found to be necessary to prevent damage to the device by the tire's deformation when riding over curbs and other obstructions. Main connecting pin 18 protrudes through a slot in mounting cylinder 12 and thus prevents rotation of plunger 29 relative to cylinders 12 and 24. The mounting subassembly also functions to protect the tire and device when the tire is flat or nearly flat. When such a condition occurs, the impact is sufficient to throw the device into the FIG. 1 position. In the FIG. 1 position the device is protected by the outer circumference of the wheel from contact with the tire interior.

FIG. 6 is an exploded view of the device. Pivots 22 pass through holes in mounting plate 17 and into bosses on gimbal ring 21. Mounting cylinder pivot 14 passes through holes in gimbal ring 21 and attaches to bosses on mounting cylinder 12 to which the signal generating subassembly is mounted. Mounting cylinder 12 is located so that it will slide within main cylinder 24 having actuating slots 28.

The signal generating subassembly includes main cylinder 24 and components mounted with main cylinder 24. Plunger 29 is slidably located within main cylinder 24 and has slots for attachment of sears 26 and a well in which sear spring 27 is located. Main retaining pin 18 is attached to plunger 29 which passes through slots in main cylinder 24 into mounting cylinder 12. Lower cylinder 23 is slidably mounted at the opposite end of main cylinder 24. Contact wheels 16 are attached to lower cylinder 23 by means of axles 19 connected to bracket 25.

Figure 7:
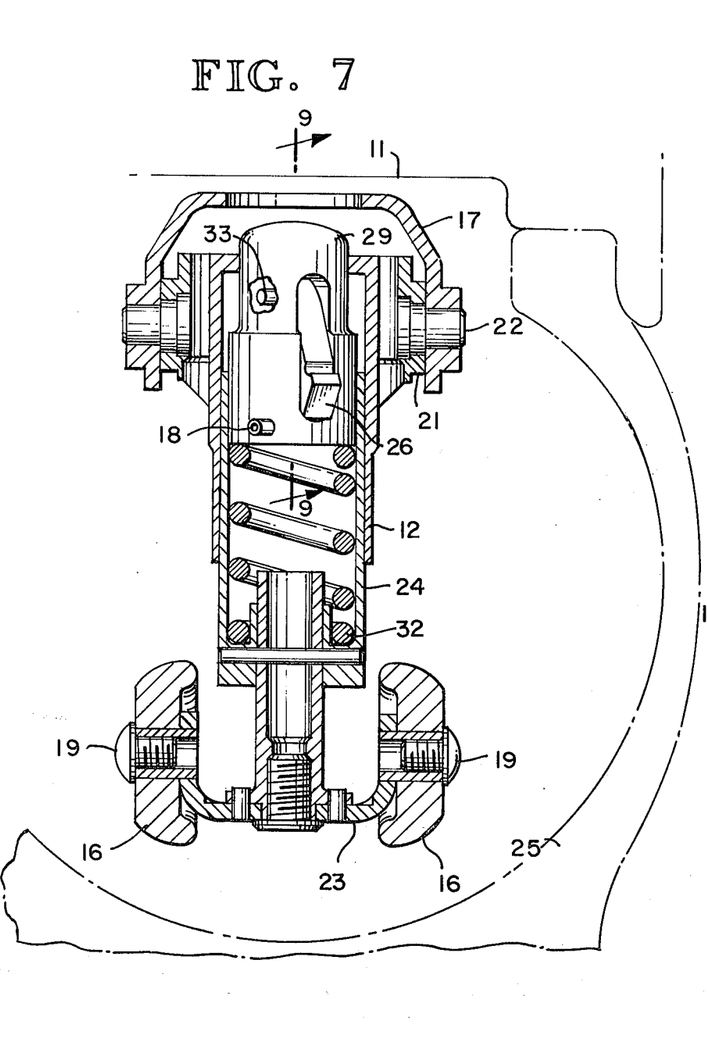
FIG. 7 is a sectional view of the FIG. 5 device in operating position.

FIG. 7 shows the device in operating position normal to the wheel axis. FIG. 7 is a sectional view allowing view of main spring 32 and the sear pivots 33. The device is also in the expanded state and wheels 16 have not contacted the interior circumference of the tire 25; therefore, no sound will be produced. The device remains in this position and state under normal tire inflation conditions.

Figure 8:
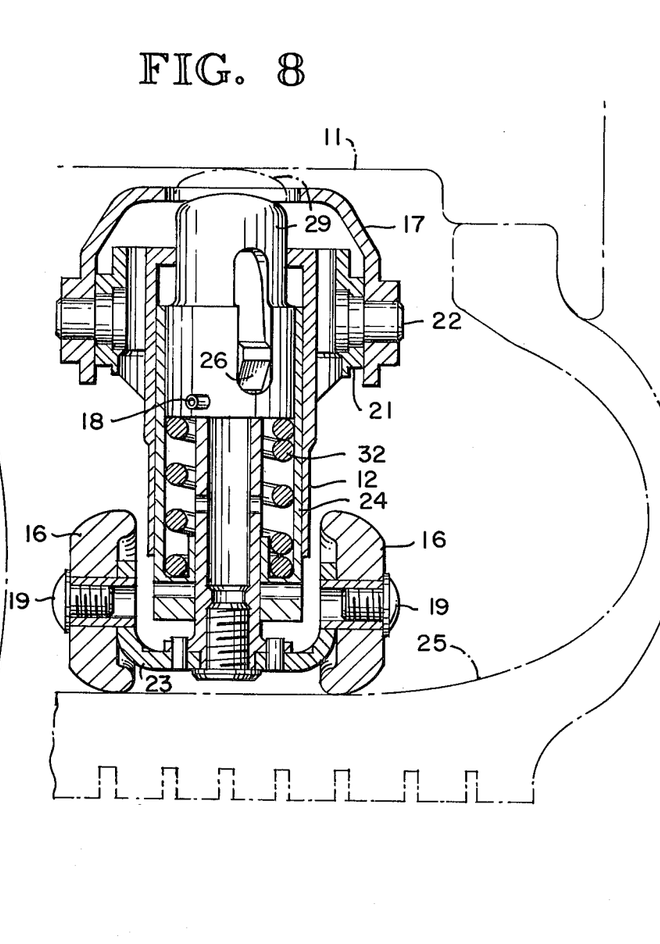
FIG. 8 is a sectional view of the FIG. 5 device in compressed position after contact with the tire.

FIG. 8 shows the device in the compressed state with wheels 16 in contact with the inner circumference of tire 25. Such a state would result when a condition of low tire inflation is present. Contact wheels 16 are forced upward by this contact. The force transmitted by axles 19 moves lower cylinder assembly 23 upwards. This movement causes main spring 32 to be compressed within cylinder 24 between plunger 29 and lower cylinder 23. The upward movement continues until sear 26 is released allowing plunger 29, which until now was held stationary by sear 26, to move upward releasing the stored energy of compression of spring 32. Plunger 29 moves as a result rapidly upwards until a contact is made with wheel rim 11 generating an audible sound. As the wheel continues rotating centrifugal force pulls lower cylinder assembly 23 downward causing the device to return to the state of FIG. 3. Once returned to this state the device is ready for another contact with the tire. A series of sounds thus results; a sound is produced each time the device is carried by the wheel past the tire's point of contact with the road. The resulting series of sounds is sufficiently loud to alert the driver to the condition of low inflation in tire 25.

Figure 9:
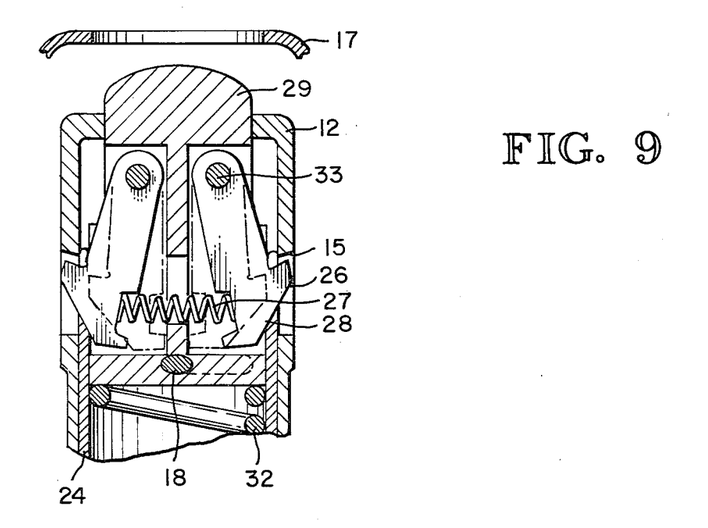
FIG. 9 is a cut-away of the release mechanism of the FIG. 5 device.

FIG. 9 clarifies the action of the release mechanism. A low air pressure condition causes contact of the tire and contact wheel. Upward motion of main cylinder 24 presses sears 26 inward due to the sloping face of sears 26 and the sloping face of the bottom of slot 28. Sears 26 as a result are forced to rotate inward on pivots 33 thus compressing sear spring 27 until the ends of sears 26 clear the inside of slot 15 in mounting cylinder 12. Under normal conditions sears 26 are held in the outward position by sear spring 27. When sears 26 are thus released, plunger 29 is free to move upward under the influence of compressed mainspring 32. Plunger 27 passes through the hole in mounting plate 17 and impacts tire rim 11. Tire rim 11 thus functions as an anvil.

Figures 10, 11:
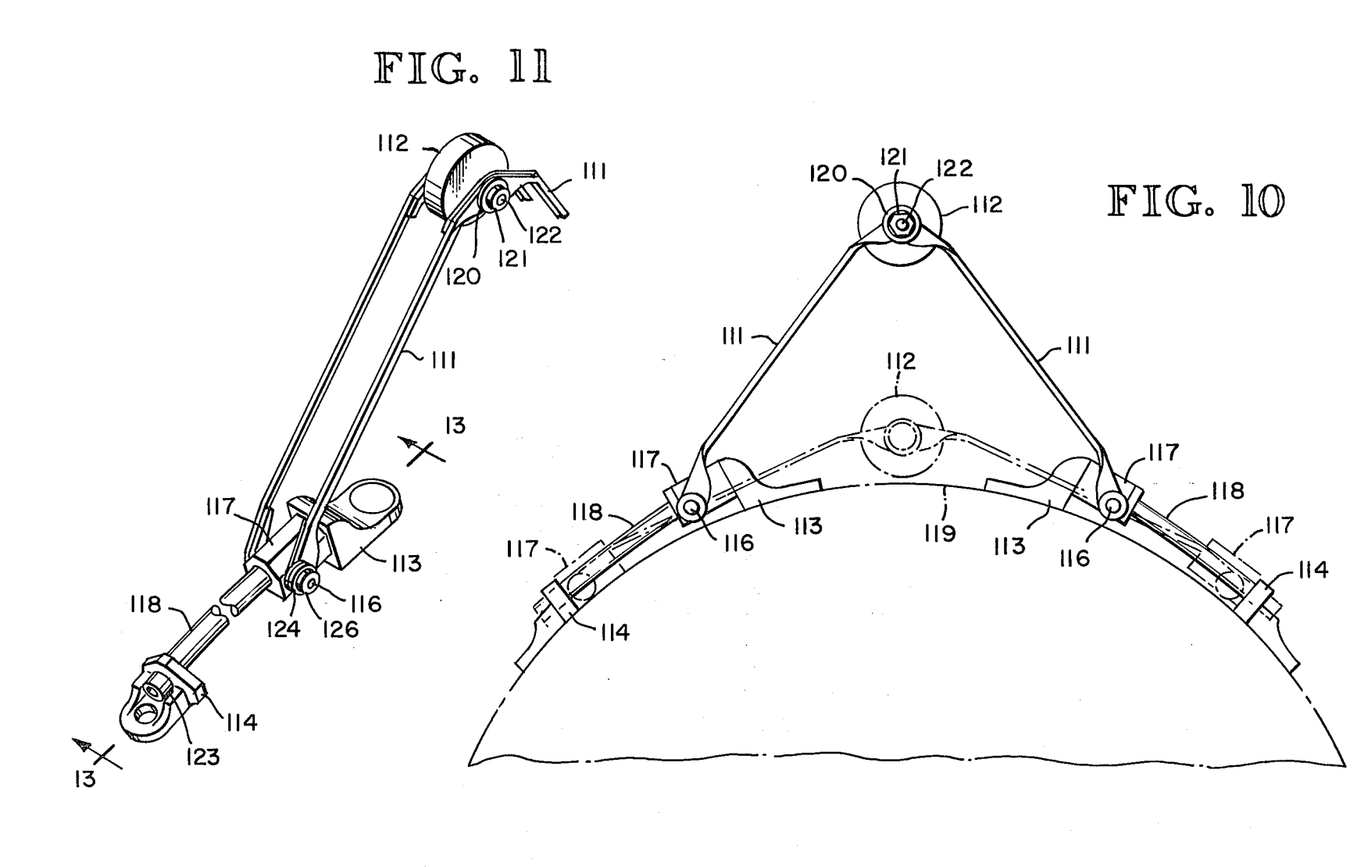
FIG. 10 is an illustration of a third embodiment of the invention viewed from the direction of the tire axis.
FIG. 11 is an oblique view of the device of FIG. 10.
Figure 12:
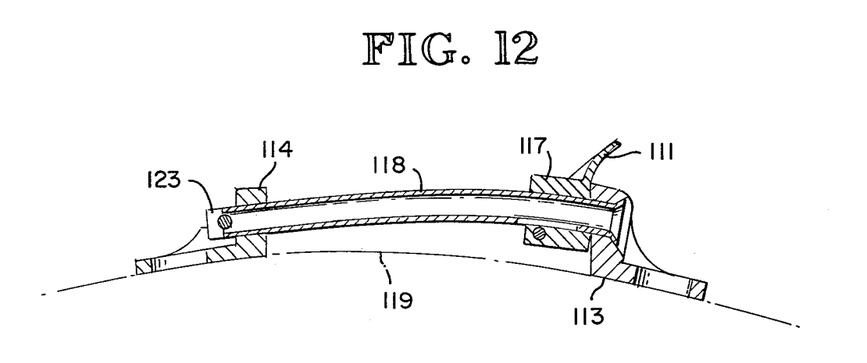
FIG. 12 is a sectional view of two anvils, and a striker block illustrating the method of mounting the FIG. 10 device.

FIGS. 10-12 illustrate a third embodiment of the invention. In this embodiment, mounting is accomplished by attachment of anvils to the wheel. This mounting allows the device to be in retracted position for tire mounting also. The signal generating subassembly is comprised of a contact wheel, bow spring and striker blocks. The contact wheel contacts the tire casing during conditions of low tire air pressure, moving the contact wheel. The energy of movement of the contact wheel is stored in the bow spring and released causing the striker blocks to impact the anvils.

FIG. 10 shows a view of the device as viewed from the direction of the tire axis. A wheel 112 is mounted at the apex of a bow spring 111. A striker block 117 is mounted at either end of bow spring 111 by means of a pivot 116. Such striker block 117 is slidably mounted on a guide tube 118 between an inner anvil 113 and an outer anvil 114.

FIG. 11 shows details of the mountings of the FIG. 10 device components in an oblique view. It is apparent that bow spring 111 is comprised of 2 members and that wheel 112 is rotatably mounted between them. Through wheel 112 passes an axle 122 which is secured by a nut 121 and a washer 120. A similar system is used to mount striker block 117 with pivot 116, a nut 126 and a washer 124. Guide tube 118 is further secured to outer anvil 114 by means of a nut 123.

FIG. 12 is a sectional view of inner anvil 113 and outer anvil 114 illustrating the method of attachment to tire rim 119. During operation of the device striker block 117 slides along guide tube 118 and a sound is produced when striker block 117 impacts outer anvil 114. A sound is also produced when striker block 117 strikes inner anvil 113.

A tire having a low air pressure condition is deformed by contact with the road to a greater degree than a tire having normal inflation. This deformation results in the inner circumference of the tire being displaced towards the axis of the wheel at the point on the tire surface which is in contact with the road. When this condition is present, the inner circumference of the tire makes contact with contact wheel 112, which does not contact the inner circumference of the tire during conditions of normal tire inflation. This contact with contact wheel 112 causes contact wheel 112 to be displaced toward the tire axis in a direction normal to the tire axis. This movement deforms bow spring 111 to which contact wheel 112 is attached. Once deformed bow spring 111 continues its motion until it is in the position shown in the dotted lines of FIG. 11. When in this position striker block 117 impacts outer anvil 114 and a sound is produced. Centrifugal force then returns bow spring 111 to its normal position once the point on the circumference of the tire adjacent the contact wheel has rotated out of the vicinity of the road, then a second sound is produced as striker block 117 strikes inner anvil 113. The impacts produce a pair of sounds each time the device rotates past the point of contact of the tire and the ground when a condition of low tire inflation is present. This rythmic sound alerts the driver to the condition of low tire inflation, thereby allowing the driver to remedy this condition before tire damage can result.

Figure 13:
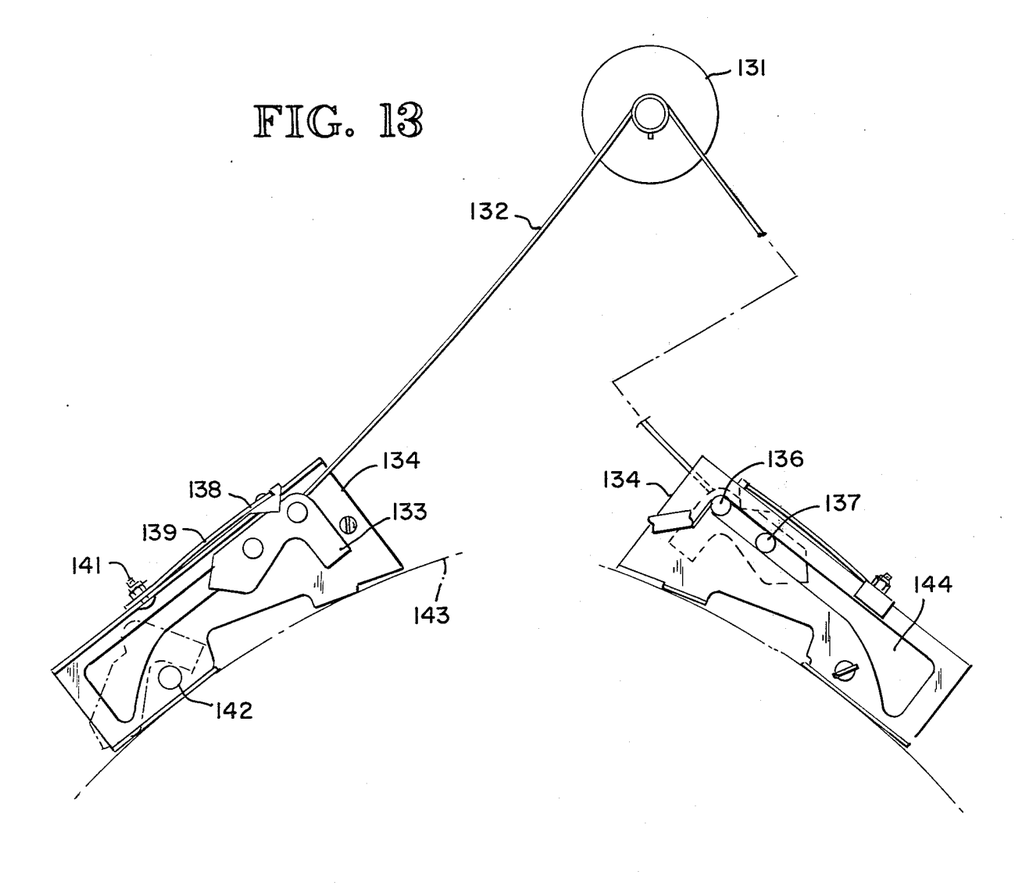
FIG. 13 is an illustration of a fourth embodiment of the invention.

FIG. 13 illustrates a fourth embodiment of the invention. A contact wheel 131 is attached to the center of the bow spring 132. The ends of bow spring 132 are attached to the striker blocks 133. Left hand striker block 133 is shown in cut-away view. Pins 136 and 137 attached to striker blocks 133 ride in slot 144 in the anvil assembly 134. A catch spring 139 is attached to anvil assembly 134 by means of a fastener 141. A block 138 on catch spring 139 matches a slot in striker block 133. Anvil assembly 134 is attached to wheel rim 143 by conventional fastening methods and is located in the tire interior.

In operation the embodiment of FIG. 13 is similar to the FIG. 10 embodiment except in the following ways: Upon contact and expansion of bow spring 132 striker blocks 133 impact pins 142 and the body of anvil assemblies 134 when bow spring 132 is in the expanded position caused by contact of contact wheel 131 with the inner circumference of the tire. Centrifugal force causes the return of striker bodies 133, pin 136 then strikes the end of slot 144. Each of these striking actions produce the alarm sound. Catch spring 139 holds bow spring 132 in the contracted position at low speeds. One advantage of this embodiment is the economies of cost in the manufacture by the substitution of stamped metal parts for machined parts. Similar variations on the basic invention would be readily apparent to a person skilled in the art. These embodiments are intended to be illustrative and not limiting of the invention.

Figure 14:
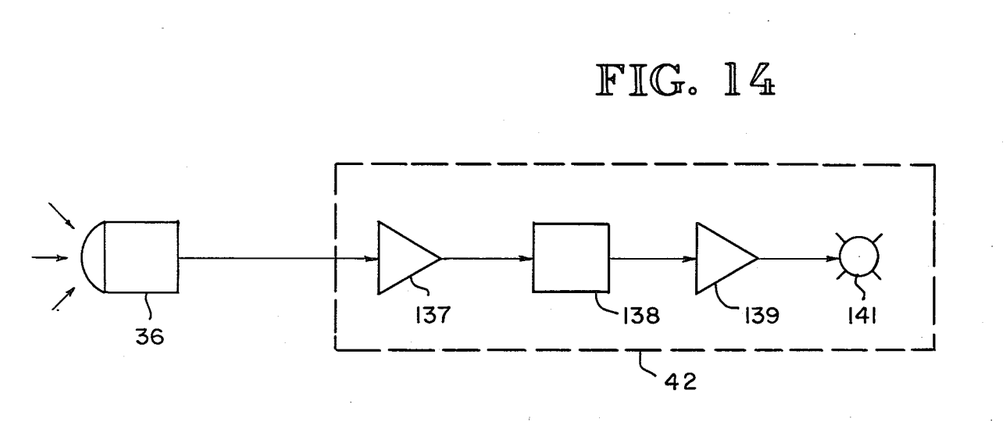
FIG. 14 is a block diagram of an electronic system which provides a visual as well as aural indication of low tire air pressure.

FIG. 14 shows an electronic means for producing a visual signal of the operation of the device: This means may be used with any embodiment of the device. Microphone 136 is mounted at a position on the vehicle where it will be able to receive audio signals produced by devices mounted in each of the vehicle's wheels. The instrument panel module 142 may be mounted in the instrument panel of the vehicle. Sound from the devices mounted in the wheels actuates microphone 136 which generates an electric signal which is transmitted to amplifier 137. Filter discriminator 138 receives the signal from amplifiers 137 and determines whether the signal is generated by the warning device or environmental conditions. If the signal is generated by the warning device filter discriminator 138 actuates lamp driver 139 which actuates warning lamp 141, thus producing a visual reminder to the driver in addition to the aural reminder produced by the device.

It will be understood that the invention may be embodied in other specific forms without departing from the spirit of the central characteristics thereof. The present examples and embodiments, therefore, are to be considered in all respects as illustrative and not restrictive, and the invention is not to be limited to the details thereof but may be modified within the scope of the appended claims.

What is claimed is:

1. A low tire inflation warning device for attachment to a wheel of an inflatable tired vehicle comprising:

tire contacting means comprising at least one wheel which is free to rotate for contacting the interior of a tire;

means connected to said tire contacting means for permitting movement of the tire contacting means toward said wheel of said vehicle in response to contact between said tire contacting means and the inner surface of the tire, said means for permitting movement comprising energy storage means operatively associated with said tire contacting means for storing a portion of the energy generated by movement of said tire contacting means toward said wheel of said vehicle;

sound generating means including striker means connected to said energy storage means for converting the energy stored therein into sound, thereby generating an audible signal in response to movement of said tire contacting means toward said wheel of said vehicle; and mounting means for mounting said sound generating means to said wheel of said vehicle.

2. A low pressure warning device for attachment to a wheel of an inflatable tired vehicle comprising:

impact signal generating means including striker means for producing an acoustic signal;

tire contacting means including a wheel which is free to rotate for contacting the interior surface of a tire;

force transmitting means to which said contacting wheel is mounted for transmitting a force generated by contact of said tire contacting means with the interior of the tire to actuate said impact signal means, said force transmitting means including a resilient member comprising a coil spring and further including means mounting said spring such that the force transmitted by said force transmitting means to actuate said impact signal means is transmitted by said spring.

3. A warning device according to claim 2 wherein said force transmitting means includes release means for preventing transmission of force by said spring to said striker means until said spring has been compressed a predetermined amount.

4. A low pressure warning device for attachment to a wheel of an inflatable tired vehicle comprising:

means for contacting the interior surface of the tire;

means connected to the contacting means for permitting movement of the contacting means toward the wheel in response to contact between the contacting means and the interior surface of the tire;

impact sound generating means including means for striking a surface in response to the movement of the contacting means toward the wheel, thereby generating an audible sound, and mounting means for mounting the impact sound generating means to the wheel, said mounting means permitting pivotal movement of the impact sound generating means in a plane perpendicular to the plane of the wheel's rotation.

5. The device of claim 4 further comprising an anvil against which the striking means will impact in response to the movement of the contacting means toward the wheel.

6. The device of claim 5 wherein the mounting means comprises a gimbal mounting.

* * * * *